United States Patent [19]
Rosenkranz et al.

[11] Patent Number: 5,976,253
[45] Date of Patent: *Nov. 2, 1999

[54] DEVICE FOR APPLYING A COATING MATERIAL TO AN OPTICAL FIBER

[75] Inventors: Jürgen Rosenkranz, Mönchengladbach; Wilhelm Reiners, Wegberg; Franz-Peter Bartling, Düsseldorf, all of Germany

[73] Assignee: Alcatel, France

[*] Notice: This patent issued on a continued prosecution application filed under 37 CFR 1.53(d), and is subject to the twenty year patent term provisions of 35 U.S.C. 154(a)(2).

[21] Appl. No.: 08/959,835

[22] Filed: Oct. 29, 1997

[30] Foreign Application Priority Data

Nov. 12, 1996 [DE] Germany .............. 196 46 623

[51] Int. Cl.⁶ .................................................. B05C 3/02
[52] U.S. Cl. .......................................... 118/405; 118/119
[58] Field of Search ................................. 118/420, 405, 118/72; 425/113, 462, 382 R, 382.3, 131.1; 264/171.18, 209.2, 245; 65/529

[56] References Cited

U.S. PATENT DOCUMENTS

| | | |
|---|---|---|
| 4,455,133 | 6/1984 | Jakob et al. . |
| 4,594,088 | 6/1986 | Paek et al. . |
| 4,622,242 | 11/1986 | Mackay . |
| 4,998,870 | 3/1991 | Seibert ............................. 264/245 |
| 5,108,683 | 4/1992 | Anand ............................. 264/245 |
| 5,656,090 | 8/1997 | Preston . |

FOREIGN PATENT DOCUMENTS

| | | |
|---|---|---|
| 0 178 736 | 10/1985 | European Pat. Off. . |
| 0 462 951 | 12/1994 | European Pat. Off. . |
| 29 19 080 | 11/1979 | Germany . |
| 33 01 788 | 8/1983 | Germany . |
| 39 19 067 | 12/1990 | Germany . |
| 39 23 683 | 1/1991 | Germany . |
| 34 27 835 | 4/1993 | Germany . |
| 42 26 343 | 2/1994 | Germany . |
| 42 29 432 | 3/1994 | Germany . |
| 43 18 666 | 12/1994 | Germany . |
| 43 31 170 | 3/1995 | Germany . |
| 44 34 147 | 3/1996 | Germany . |

*Primary Examiner*—Brenda A. Lamb
*Attorney, Agent, or Firm*—Ware, Fressola, Van der Sluys & Adolphson LLP

[57] ABSTRACT

A device for applying a coating material to an optical fiber (1) has a coating nozzle (7) arranged in a nozzle holder (3) and a coating chamber (17) located before the coating nozzle (7) in the direction of travel of the optical fiber (1). Beyond that the device has at least one inlet channel (19) which is connected to the coating chamber (17), as well as a number of feed lines (23) for different coating materials. A connection can be established between one of the feed lines (23) and the at least one inlet channel (19), so that a change of coating material can be made in a simple manner, particularly a color change, without costly conversion and cleaning operations.

13 Claims, 6 Drawing Sheets

DEVICE FOR APPLYING A COATING MATERIAL TO AN OPTICAL FIBER

BACKGROUND OF THE INVENTION

1. Technical Field

The invention concerns a device for applying a coating material to an optical fiber with a nozzle holder, a coating nozzle arranged inside the nozzle holder, a coating chamber located before the coating nozzle in the direction of travel of the fiber, and at least one inlet channel for a coating material, which is connected to the coating chamber.

2. Description of the Prior Art

Such a device for applying a coating material is used to manufacture an optical glass fiber for telecommunications, which is drawn from a glass preform. Guiding the glass fiber over pulleys requires providing the glass fiber with a coating in order to protect it against damage from unacceptably high mechanical stresses. To that end, the optical glass fiber is coated with one or several layers, for example of a polymer material, where these have regular mechanical differences when several layers are applied. As a rule, the outer layer of the coating on the optical fiber is also used to identify the optical fiber in order to be able to identify individual fibers from a multitude of fibers.

It is therefore customary to use twelve or more differently colored coating materials in devices for applying coating material to optical fibers. Since the known coating devices only have one feed line for the coating material to be applied to the optical fibers, a change of color requires changing the storage container with the supply line to the device, as well as a complete cleaning of the coating device. To avoid correspondingly long idle and change-over times of the coating device, it is possible to arrange two or more identical devices for applying differently colored coating materials in a line, where each of these devices is used to apply just one color. However, such an arrangement occupies a large space in the production line. Furthermore, the additional devices for applying coating material find very little use. If the production line is changed over to coating materials of other colors, it is associated with a sizable effort.

SUMMARY OF THE INVENTION

Starting from this state of the art, the invention has the object of presenting a device for applying a coating material to an optical fiber, in which a quick change-over of the coating material is possible without costly conversion and cleaning operations.

The invention solves this problem in that the device contains a number of feed lines for different coating materials, and a connection can be established between one of the respective feed lines and the at least one inlet channel.

The advantages to be gained with the invention comprise especially that a quick change of the coating material is possible without costly conversion and cleaning operations, by connecting the respective feed line via the inlet channel or channels to the coating chamber as a function of the desired coating material. In that case, the other feed lines of the device are closed off so that no other coating material is able to enter the coating chamber. The device is therefore particularly advantageous when coating materials of different colors are applied to optical fibers in a production line. Beyond that, the space required to apply the coating to the optical fiber in the production line is reduced. In addition, it is possible to supply a number of production lines with coating materials of different colors from a central supply.

The device of the invention is simple to construct, it is cost effective and flexible in its use.

For a simple establishment and termination of the connection between the at least one inlet channel that is connected to the coating chamber and the feed lines for the coating materials, it is an advantage if the inlet channel can move or rotate with respect to the feed lines.

In that case, it is advantageous if the inlet channel is located in the nozzle holder and the nozzle holder can move or rotate in the device, resulting in a particularly simple construction of the device of the invention.

For the same reasons, it is also advantageous if a slide is provided between the feed lines and the at least one inlet channel, to establish a connection between one of the respective feed lines and the inlet channel, and if this slide can move or rotate. This makes it possible to establish or terminate connections between the feed lines and the inlet channel in a particularly precise and liquid-proof manner.

It is an advantage if the feed lines for the coating materials are connected to a central supply system. Such a system makes it possible to supply coating materials of different colors to a number of coating devices according to the invention, and in this way simplify the construction of a coating system comprising several fiber production lines.

Embodiments of the invention are illustrated in simplified form by the drawings and are explained in greater detail in the following description.

DETAILED DESCRIPTION OF THE INVENTION

Figure 1:
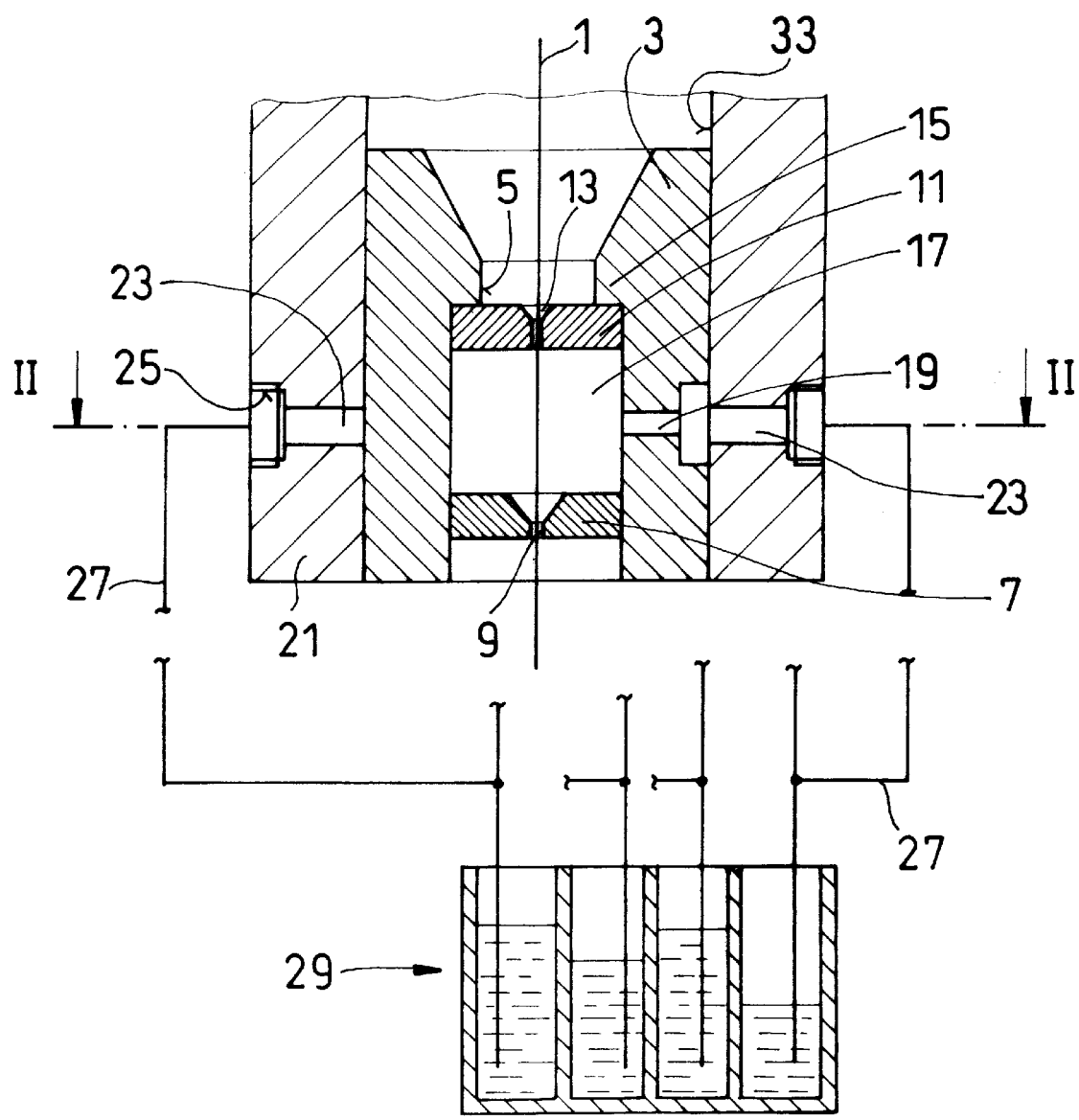
FIG. 1 is a cross-sectional view of a first embodiment of the invention of a device for applying a coating material to an optical fiber.
Figure 2:
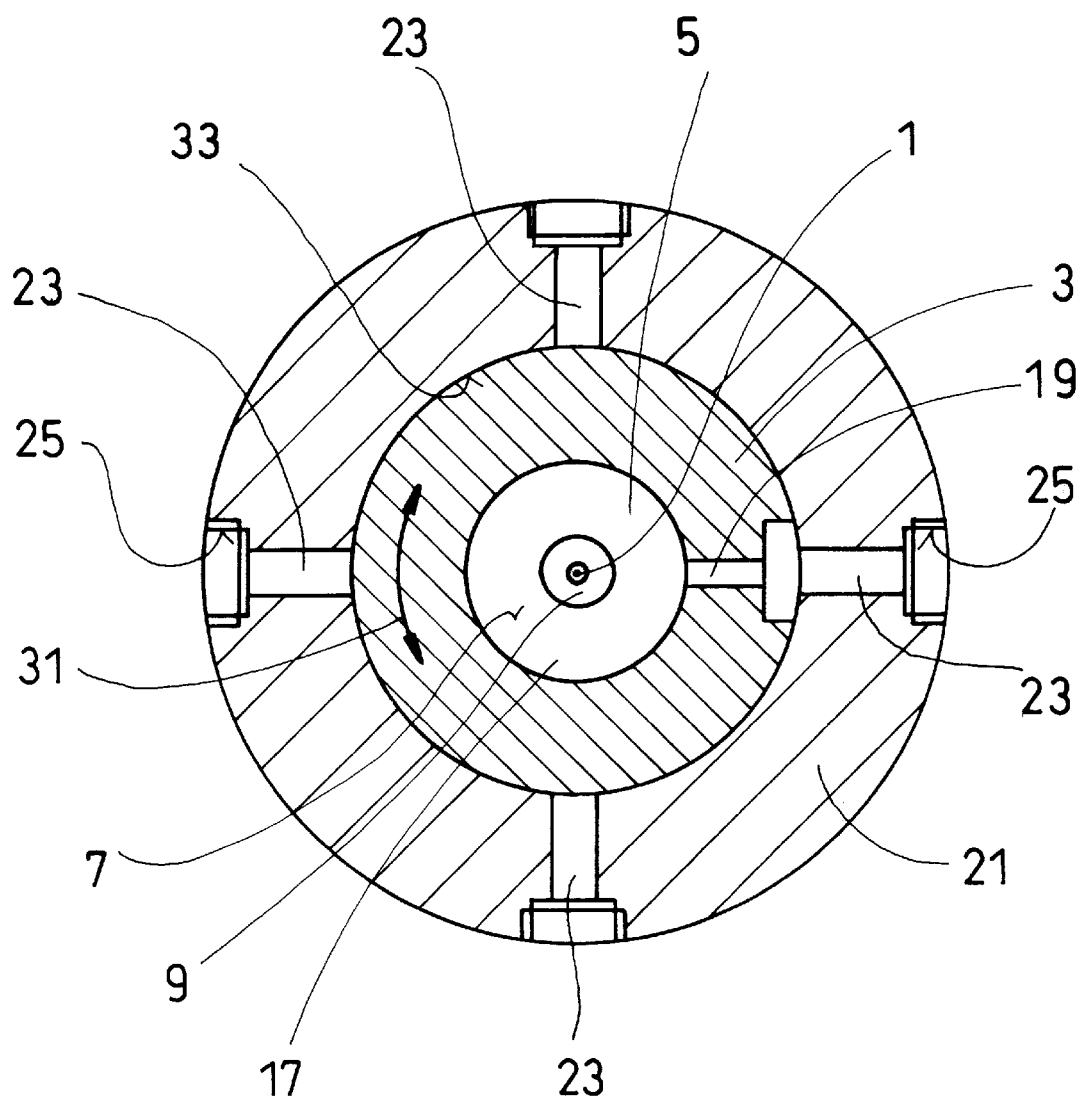
FIG. 2 is a cross-sectional view taken along line II—II in FIG. 1.

The device for applying a coating material to an optical fiber 1, illustrated as an example in FIGS. 1 and 2, has a nozzle holder 3 with a circular cross section and a stepped longitudinal bore 5. A coating nozzle 7 containing a through hole 9 is located at the end of this longitudinal bore 5 which faces away from where the fiber enters into the device. In this embodiment, an inlet nozzle 11 with a through hole 13 is located in the longitudinal bore 5 of the nozzle holder 3 at the end that faces the entrance of the optical fiber 1 into the device, which faces away from the coating nozzle 7 and is supported in a radial direction by a shoulder 15 of the stepped longitudinal bore 5 which extends inward. A coating chamber 17 filled with coating material, through which the optical fiber 1 runs vertically downward, is formed in the longitudinal bore 5 between the inlet nozzle 11 and the coating nozzle 7. In this way, the coating material is applied to the optical fiber 1. Excess coating material is wiped from the optical fiber 1 in the coating nozzle 7, where the diameter of the through hole 9 of the coating nozzle 7 determines the wall thickness of the coating applied to the optical fiber 1. The diameter of the through hole 13 of the inlet nozzle 11 is only slightly larger than the uncoated optical fiber 1, so that air or particles carried along by the optical fiber are wiped off and the optical fiber 1 is centered.

The nozzle holder 3 contains an inlet channel 19 which extends in the radial direction through the nozzle holder wall, one end of which is connected to the coating chamber 17. For example, the largest diameter of the stepped inlet channel 19 is at circumference of the nozzle holder 3.

The nozzle holder 3 is surrounded by a housing part 21 in which four feed lines 23 are located. The feed lines 23 extend in the radial direction through the wall of the housing part and can be connected to the inlet channel 19 to supply the device with coating materials of different colors. When viewed for example in the direction of travel of the optical fiber 1 through the device, the feed lines 23 are at the same height as the inlet channel 19 and are uniformly distributed around the circumference of the housing part 21. At their outer end on the circumference of the housing part 21, each of the feed lines 23 has a threaded section 25 used to establish a connection with a supply line 27. The supply lines 27 in turn are connected to a central supply system 29 which can accept four coating materials of different colors separately from each other, and is able to supply the different coating materials to several devices arranged in parallel with each other.

As indicated by the arrow 31 in FIG. 2, which illustrates a cut along line II—II in FIG. 1, the nozzle holder 3 with the coating nozzle 7 and the inlet nozzle 11 are arranged in a cylindrical bore 33 of the housing part 21 so that they can rotate. By rotating the nozzle holder 3 containing the inlet channel 19, an overlap of inlet channel 19 and one of the feed lines 23 of the housing part 21 lying in the same plane can be created, and in this way a connection can be established between the feed line 23 and the coating chamber 17 by means of the inlet channel 19 which is aligned with the feed line 23. Thus, the coating material of the desired color can be fed from the corresponding reservoir of the central supply system 29 to the coating chamber 17 through which the optical fiber 1 runs. Only one of the feed lines 23 of the illustrated device is connected to the coating chamber 17, while the other feed lines 23 are closed off by the nozzle holder 3.

Figure 3:
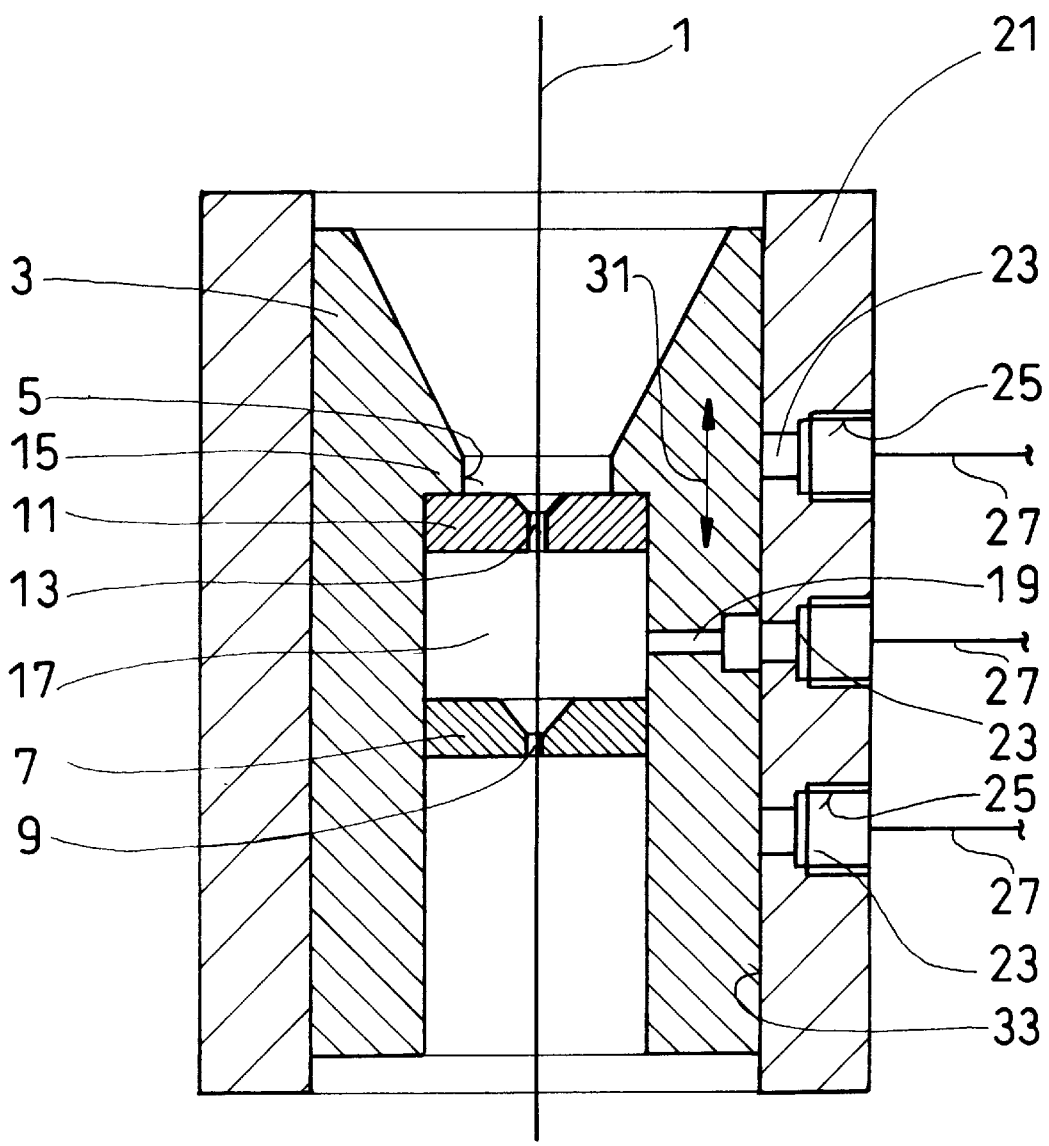
FIG. 3 is a cross-sectional view of a second embodiment of the invention.

The second embodiment of the invention illustrated in FIG. 3 essentially differs from the first embodiment illustrated in FIGS. 1 and 2 only in that the nozzle holder 3, with the coating chamber 17 formed therein between the inlet nozzle 11 and the coating nozzle 7, is able to move in the cylindrical bore 33 in the longitudinal direction of the housing part 21, thus in parallel with the passing optical fiber 1. The housing part 21 has three feed lines 23 passing through the wall of the housing part, which are arranged to lie above each other in the direction of travel of the optical fiber 1, thus in the longitudinal direction of the device. Each of these three feed lines 23 is used to supply a coating material of a different color to the coating chamber 17, and is connected by supply lines 27 to a central supply system. By moving the nozzle holder 3 in the cylindrical bore 33 of the housing part 21 in the direction of arrow 31, and moving the inlet channel 19 accordingly in this direction, a connection between one of the feed lines 23 which is connected to the central supply system and the coating chamber 17 can be established by means of the aligned inlet channel 19, and the desired coating material can be fed into the coating chamber.

In that case, the other two feed lines 23 are closed off by the nozzle holder 3.

Figure 4:
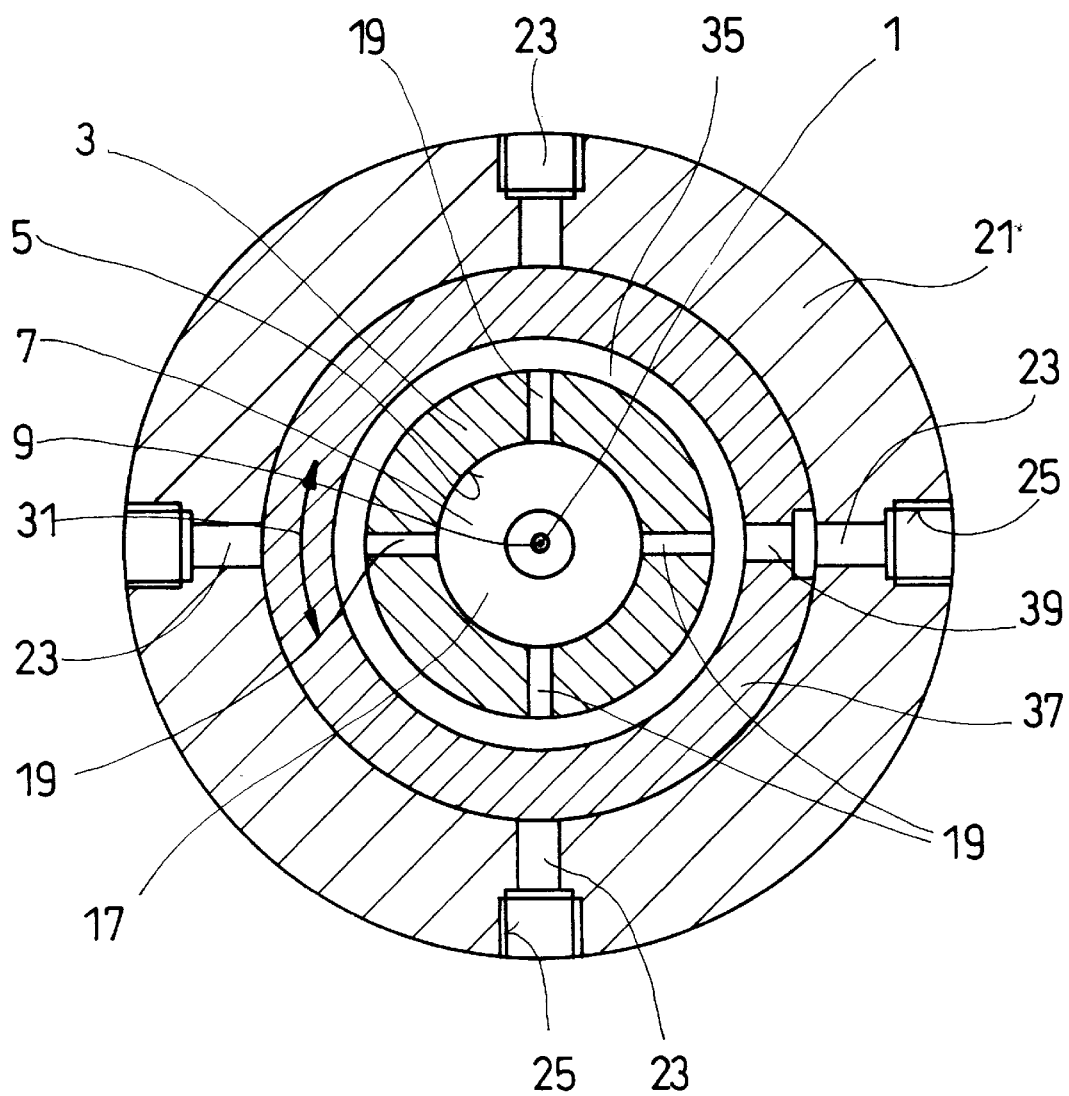
FIG. 4 is a cross-sectional view of a third embodiment of the invention.

The nozzle holder 3 in the third embodiment of the invention illustrated in FIG. 4 contains four inlet channels 19 which are connected to the coating chamber 17 in a common plane that is normal to the direction of travel of the optical fiber 1. The inlet channels 19 are uniformly distributed around the circumference of the nozzle holder 3. An annular groove 35 is formed around the circumference of the nozzle holder 3 in the plane of the inlet channels 19, where it establishes a connection between the four inlet channels 19 and in this way makes it possible to uniformly feed the respective coating material into the coating chamber 17. The nozzle holder 3 is surrounded by a slide 37 having a circular cross section, which can be rotated with respect to the nozzle holder. The slide 37 has a slide bore 39 connecting it to the annular groove 35 on the circumference of the nozzle holder 3, which extends in the radial direction through the wall of the slide 37. The rotatable slide 37 in turn is surrounded by the housing part 21, which has four feed lines 23 uniformly distributed around the circumference of the housing part 21 in the inlet channel 19 plane, like the first embodiment illustrated in FIGS. 1 and 2, which extend radially through the wall of the housing part 21 and feed the coating material into the coating chamber 17. When the slide 37 is rotated as indicated by the arrow 31, a connection can be established with the slide bore 39 between a respective feed line 23 and the coating chamber 17, whereby the desired coating material enters the coating chamber 17 through the slide bore 39 which is aligned with the respective feed line 23, via the annular groove 35 and the four inlet channels 17 of the nozzle holder 3. In that case, the other feed lines 23 are closed off by the slide 37 so that no other coating material is able to get into the coating chamber 17. Otherwise this embodiment corresponds essentially to the first embodiment in FIGS. 1 and 2.

Figure 5:
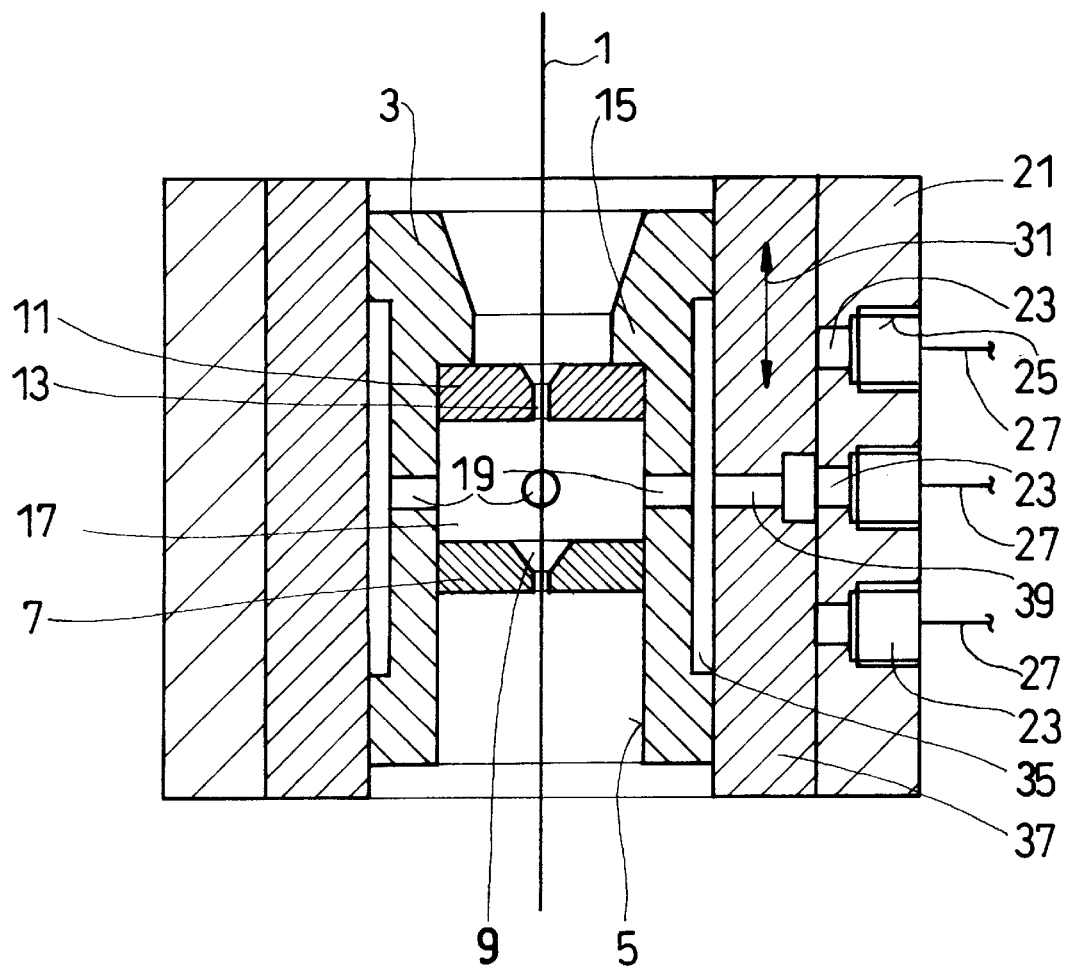
FIG. 5 is a cross-sectional view of a fourth embodiment of the invention.

The fourth embodiment of the invention illustrated in FIG. 5 also has a circular slide 37 located between the nozzle holder 3 and the housing part 21, which can move longitudinally in the device in the direction of the arrow 31, and parallel to the optical fiber 1 inside the cylindrical bore 33 of the housing part 21. This slide 37 has a slide bore 39 which passes radially through its wall and is connected to a relatively wide annular groove 35 formed in the circumference of the nozzle holder 3. Four inlet channels 19 (only three are shown) are formed in a plane, which is normal to the optical fiber 1, and extend through the wall of the nozzle holder 3, one of their ends is connected to the coating chamber 17 formed between the inlet nozzle 11 and the coating nozzle 7, and the other end is connected to the annular groove 35 of the nozzle holder 3. As in the second embodiment illustrated in FIG. 3, three feed lines 23 for supplying coating material of different colors are arranged above each other in the housing part 21 in the direction of travel of the optical fiber 1. By moving the slide 37 accordingly in the direction of the arrow 31, thus parallel to the direction of travel of the optical fiber 1, a connection can be established between the desired feed line 23 and the annular groove 35 formed in the circumference of the nozzle holder 3 by means of the slide bore 39 which is aligned with the feed line, while the other feed lines 23 are closed off by the slide 37. The coating material can easily be changed by simply moving the slide 37 and overlapping the slide bore 39 with another feed line 23.

Figure 6:
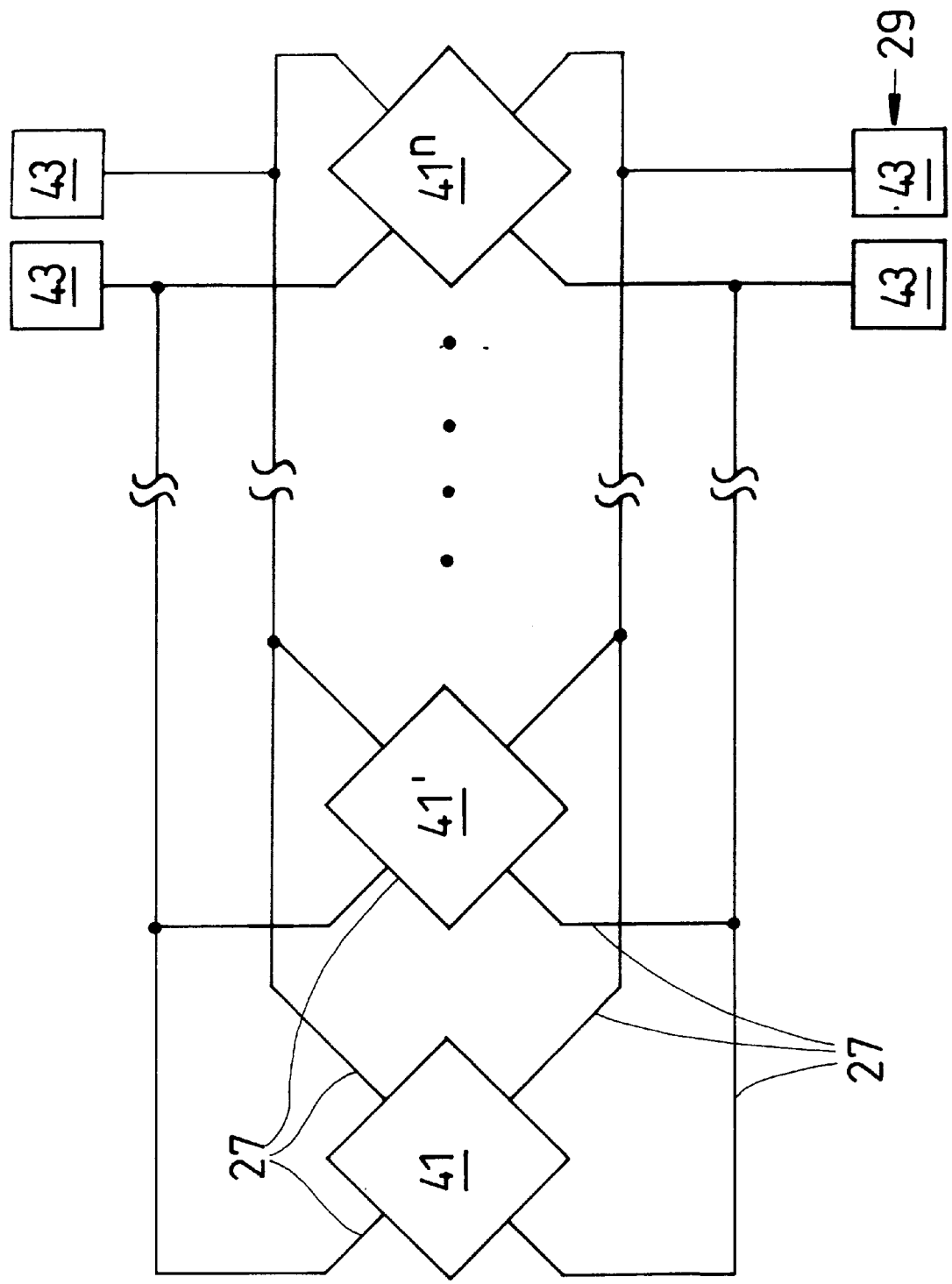
FIG. 6 is a schematic illustration of several devices for applying a coating material arranged in parallel with each other and connected with a central coating material supply system.

By means of a schematic and rigorously simplified illustration, FIG. 6 shows an installation with several devices 41, 41', 41" of the invention for applying coating materials to optical fibers. The supply lines 27 of the devices 41, 41', 41" are interconnected in a way so that each device can receive the required coating materials from a central supply system 29 which has a respective container 43 for each of the differently colored coating materials.

The preferred embodiments described above admirably achieve the objects of the invention. However, it will be appreciated that departures can be made by those skilled in the art without departing from the spirit and scope of the invention which is limited only by the following claims.

What is claimed is:

1. A device for applying a coating material to an optical fiber, which comprises:

(a) a nozzle holder supporting an inlet nozzle and a coating nozzle, defining therebetween a coating chamber adapted to contain coating material through which the optical fiber runs, the inlet nozzle defining a through hole, for passage of the optical fiber, sufficiently small to wipe off air or particles carried along by the optical fiber entering the inlet nozzle, the coating chamber being located before the coating nozzle in a direction of travel of the optical fiber and having at least one inlet channel adapted to introduce said coating material into the coating chamber;

(b) a housing surrounding the nozzle holder, said housing having a plurality of feed lines for different coating materials; and (c) means for alternatively selecting one of the feed lines to establish a connection between the selected one of the feed lines and the at least one inlet channel.

2. A device as claimed in claim 1, wherein said selecting means permits relative movement between the at least one inlet channel and the feed lines.

3. A device as claimed in claim 2, wherein the relative movement is a relative rotation.

4. A device as claimed in claim 3, wherein said selecting means permits the nozzle holder to rotate inside of said housing.

5. A device as claimed in claim 2, wherein the relative movement is a movement in a longitudinal direction of the device.

6. A device as claimed in claim 1, wherein said selecting means permits the nozzle holder to rotate, inside of said housing.

7. A device as claimed in claim 1, wherein said selecting means includes a slide provided between the housing and the nozzle holder to establish the connection between a selected one of the feed lines and the at least one inlet channel.

8. A device as claimed in claim 7, wherein the slide is moveable in a longitudinal direction of the device.

9. A device as claimed in claim 7, wherein the slide is rotatable to establish the connection.

10. A device as claimed in claim 1, further including a central supply system connected to the feed lines for the coating materials.

11. A device as claimed in claim 1, wherein the different coating materials have different colors.

12. A device for applying a coating material to a moving optical fiber, which comprises:

(a) a nozzle holder having a coating nozzle thereby defining a coating chamber structured and arranged to contain coating material, through which the optical fiber runs, the coating chamber being located before the coating nozzle in a direction of travel of the optical fiber and having at least one inlet channel adapted to introduce said coating material into the coating chamber;

(b) a housing surrounding the nozzle holder, said housing having a plurality of feed lines for different coating materials; and (c) means for alternatively selecting one of the feed lines to establish a connection between the selected one of the feed lines and the at least one inlet channel, wherein said selecting means permits relative movement between the at least one inlet channel and the feed lines, and permits the nozzle holder to move, inside of said housing, in a longitudinal direction of the applying device.

13. A device for applying a coating material to a moving optical fiber, which comprises:

(a) a nozzle holder having a coating nozzle thereby defining a coating chamber structured and arranged to contain coating material through which the optical fiber runs, the coating chamber being located before the coating nozzle in a direction of travel of the optical fiber and having at least one inlet channel adapted to introduce said coating material into the coating chamber;

(b) a housing surrounding the nozzle holder, said housing having a plurality of feed lines for different coating materials; and (c) means for alternatively selecting one of the feed lines to establish a connection between the selected one of the feed lines and the at least one inlet channel, wherein said selecting means permits the nozzle holder to move, inside of said housing having a plurality of feed lines, in a longitudinal direction of the applying device.

* * * * *